US007771499B2

(12) United States Patent
Oh et al.

(10) Patent No.: US 7,771,499 B2
(45) Date of Patent: Aug. 10, 2010

(54) MULTI-CYCLONE DUST SEPARATING APPARATUS OF A VACUUM CLEANER

(75) Inventors: Jang-keun Oh, Gwangju (KR); Min-ha Kim, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 559 days.

(21) Appl. No.: 11/812,784

(22) Filed: Jun. 21, 2007

(65) Prior Publication Data

US 2008/0155947 A1 Jul. 3, 2008

(30) Foreign Application Priority Data

Dec. 28, 2006 (KR) ...................... 10-2006-0136001

(51) Int. Cl.
*B01D 45/12* (2006.01)

(52) U.S. Cl. ............................ 55/343; 55/349; 55/426; 55/429; 55/459.1; 55/DIG. 3

(58) Field of Classification Search .................. 55/343, 55/349, 419, 426, 429, 459.1, DIG. 3
See application file for complete search history.

(56) References Cited

U.S. PATENT DOCUMENTS 1,207,034 A 12/1916 Harsant
1,416,885 A 5/1922 Schreiner
1,416,995 A 5/1922 Stroud
2,539,257 A 1/1950 Limberg
2,511,387 A 6/1950 Watson et al.
2,539,195 A 1/1951 Lang
2,553,175 A 5/1951 Davenport et al.
3,046,718 A 7/1962 Ide et al.
3,078,650 A 2/1963 Anderson
3,425,192 A 2/1969 Davis
3,769,781 A 11/1973 Klein et al.
3,898,068 A 8/1975 McNeil
4,373,228 A 2/1983 Dyson
4,826,515 A 5/1989 Dyson
4,853,008 A 8/1989 Dyson et al.
5,078,761 A 1/1992 Dyson
5,145,499 A 9/1992 Dyson et al.
5,160,356 A 11/1992 Dyson
5,163,786 A 11/1992 Christianson (Continued)

FOREIGN PATENT DOCUMENTS

CN 87205753 10/1987

(Continued)

*Primary Examiner*—Robert A Hopkins
(74) *Attorney, Agent, or Firm*—Blank Rome LLP

(57) ABSTRACT

The multi-cyclone dust separating apparatus includes a first cyclone unit having a body and including an air inlet disposed at a side of the body, a first cyclone chamber adapted to form a first space for whirling air from the air inlet to separate dust form the air; a second cyclone unit adapted to be detachably disposed at the body of the first cyclone unit and including, a second air inlet to draw the air from the first cyclone chamber, at least one cyclone for whirling the air from the first cyclone chamber to provide a second separation of dust from the air; and a dust bin adapted to be detachably mounted to at least one of the second cyclone unit and the first cyclone unit.

18 Claims, 7 Drawing Sheets

U.S. PATENT DOCUMENTS

| | | | |
|---|---|---|---|
| 5,254,147 | A | 10/1993 | Finke |
| 5,307,538 | A | 5/1994 | Rench et al. |
| 6,171,356 | B1 | 1/2001 | Twerdun et al. |
| 6,238,451 | B1 | 5/2001 | Conrad et al. |
| 6,264,712 | B1 | 7/2001 | Decker |
| 6,269,518 | B1 | 8/2001 | Yung |
| 6,334,234 | B1 | 1/2002 | Conrad et al. |
| 6,368,373 | B1 | 4/2002 | Mueller |
| 6,428,589 | B1 | 8/2002 | Bair et al. |
| 6,431,404 | B1 | 8/2002 | Long, Jr. |
| 6,436,160 | B1 | 8/2002 | Stephens et al. |
| 6,502,278 | B2 * | 1/2003 | Oh et al. ....................... 15/353 |
| 6,582,489 | B2 | 6/2003 | Conrad |
| 6,607,572 | B2 | 8/2003 | Gammack et al. |
| 6,625,845 | B2 | 9/2003 | Matsumoto et al. |
| 6,740,144 | B2 | 5/2004 | Conrad et al. |
| 6,746,500 | B1 | 6/2004 | Park et al. |
| 6,766,558 | B1 | 7/2004 | Matsumoto et al. |
| 6,829,804 | B2 | 12/2004 | Sepke |
| 7,097,680 | B2 | 8/2006 | Oh |
| 7,140,068 | B1 | 11/2006 | Vander Baan et al. |
| 7,169,201 | B2 | 1/2007 | Oh et al. |
| 2001/0005983 | A1 | 7/2001 | Berfield et al. |
| 2001/0005986 | A1 | 7/2001 | Matsubara et al. |
| 2001/0025395 | A1 | 10/2001 | Matsumoto et al. |
| 2001/0054213 | A1 | 12/2001 | Oh et al. |
| 2002/0011053 | A1 | 1/2002 | Oh |
| 2002/0020154 | A1 | 2/2002 | Yang |
| 2002/0066366 | A1 | 6/2002 | Conrad et al. |
| 2003/0067765 | A1 | 4/2003 | Li |
| 2004/0010885 | A1 | 1/2004 | Hitzelberger et al. |
| 2004/0025285 | A1 | 2/2004 | McCormick et al. |
| 2004/0074041 | A1 | 4/2004 | Overvaag |
| 2004/0098958 | A1 | 5/2004 | Roth et al. |
| 2004/0103785 | A1 | 6/2004 | North |
| 2005/0050678 | A1 | 3/2005 | Oh et al. |
| 2005/0252180 | A1 | 11/2005 | Oh et al. |
| 2006/0123590 | A1 | 6/2006 | Fester et al. |

FOREIGN PATENT DOCUMENTS

| | | | |
|---|---|---|---|
| CN | 2087999 | | 11/1991 |
| CN | 1067295 | | 12/1992 |
| CN | 22550815 | Y | 2/1997 |
| CN | 1296801 | A | 5/2000 |
| CN | 1361673 | | 7/2000 |
| CN | 1312049 | | 9/2001 |
| CN | 2518598 | | 10/2002 |
| CN | 1389175 | | 1/2003 |
| CN | 2530580 | | 1/2003 |
| CN | 1422187 | | 6/2003 |
| CN | 1426745 | | 7/2003 |
| CN | 1434688 | | 8/2003 |
| DE | 1282872 | | 11/1968 |
| DE | 2811536 | | 11/1978 |
| DE | 1336829 | | 11/1979 |
| DE | 29908567 | U1 | 1/2000 |
| DE | 20102723 | | 6/2001 |
| DE | 10132690 | | 7/2002 |
| DE | 20306405 | | 10/2003 |
| DE | 10110581 | C2 | 11/2003 |
| DE | 102004028677 | | 3/2005 |
| DE | 102004028675 | | 4/2005 |
| DE | 102004028676 | | 4/2005 |
| DE | 102004030600 | | 9/2005 |
| EP | 0095354 | | 11/1983 |
| EP | 0728435 | | 8/1996 |
| EP | 0923992 | A2 | 6/1999 |
| EP | 1199023 | A1 | 4/2002 |
| EP | 1362543 | | 11/2003 |
| EP | 1745853 | | 1/2007 |
| ES | 2105467 | | 10/1997 |
| ES | 2196837 | | 12/2003 |
| FR | 2619498 | | 2/1989 |
| FR | 2859370 | | 3/2005 |
| GB | 835884 | | 5/1960 |
| GB | 1107045 | | 3/1968 |
| GB | 1207034 | | 9/1970 |
| GB | 2317122 | | 3/1998 |
| GB | 2326360 | | 12/1998 |
| GB | 2360719 | | 10/2001 |
| GB | 2374305 | | 10/2002 |
| GB | 2375980 | | 12/2002 |
| GB | 2376176 | | 12/2002 |
| GB | 2377656 | | 1/2003 |
| GB | 2381484 | | 5/2003 |
| GB | 2401076 | | 11/2004 |
| GB | 2406065 | | 3/2005 |
| GB | 2418163 | | 3/2006 |
| JP | 50101012 | | 8/1975 |
| JP | S5214775 | | 2/1977 |
| JP | 09-234174 | | 9/1997 |
| JP | 09234174 | | 9/1997 |
| JP | 2002051951 | | 2/2002 |
| JP | 2002143052 | | 5/2002 |
| JP | 2002172077 | | 6/2002 |
| JP | 2002326041 | | 11/2002 |
| JP | 2003024826 | | 1/2003 |
| JP | 2003116752 | | 4/2003 |
| JP | 2004357767 | A | 12/2004 |
| KR | 1019930000527 | B1 | 1/1993 |
| KR | 19930021001 | | 10/1993 |
| KR | 1020010104810 | | 11/2001 |
| KR | 1020030032497 | A | 4/2003 |
| KR | 1020040017195 | A | 2/2004 |
| KR | 1020040099980 | | 12/2004 |
| KR | 1020060087853 | | 8/2006 |
| RU | 2137530 | | 9/1999 |
| RU | 2174452 | | 10/2001 |
| RU | 2206029 | | 6/2003 |
| SH | 53-141859 | | 11/1978 |
| WO | WO-99/42198 | | 8/1999 |
| WO | WO-0044272 | | 8/2000 |
| WO | WO-00/64321 | | 11/2000 |
| WO | WO-00/74547 | | 12/2000 |
| WO | WO-00/74548 | | 12/2000 |
| WO | WO-01/60524 | A1 | 8/2001 |
| WO | WO-0174493 | | 10/2001 |
| WO | 0-0195780 | | 12/2001 |
| WO | WO-02067750 | | 9/2002 |
| WO | WO-02067756 | | 9/2002 |
| WO | WO-03030702 | | 4/2003 |
| WO | WO 2006/010881 | | 2/2006 |

* cited by examiner

MULTI-CYCLONE DUST SEPARATING APPARATUS OF A VACUUM CLEANER

CROSS-REFERENCES TO RELATED APPLICATIONS

This application claims the benefit of priority under 35 U.S.C. §119(a) from Korean Patent Application No. 10-2006-136001, filed on Dec. 28, 2006 in the Korean Intellectual Property Office, the entire disclosure of which is incorporated herein by reference.

This application is related to copending U.S. patent application Ser. No. 10/840,248, filed May 7, 2004 entitled "Cyclone Separating Apparatus and a Vacuum Cleaner Having the Same" by Jang-Keun Oh et al., the entire disclosure of which is incorporated herein by reference.

This application is related to copending U.S. patent application Ser. No. 10/840,230, filed May 7, 2004 entitled "Cyclone Separating Apparatus and a Vacuum Cleaner Having the Same" by Jang-Keun Oh et al., the entire disclosure of which is incorporated herein by reference.

This application is related to copending U.S. patent application Ser. No. 10/840,231, filed May 7, 2004 entitled "Cyclone Dust Separating Apparatus and Vacuum Cleaner Having the Same" by Jang-Keun Oh et al., the entire disclosure of which is incorporated herein by reference.

This application is related to U.S. Pat. No. 7,097,680 to Jang-Keun Oh, entitled "Cyclone Separating Apparatus and Vacuum Cleaner Equipped with the Same," now the entire disclosure of which is incorporated herein by reference.

This application is related to the copending U.S. patent application Ser. No. 10/851,114, filed May 24, 2004 entitled "Cyclone Dust Collecting Device for Vacuum Cleaner" by Jang-Keun Oh et al., the entire disclosure of which is incorporated herein by reference.

This application is related to copending U.S. patent application Ser. No. 10/874,257, filed Jun. 24, 2004 entitled "Cyclone Dust Collecting Apparatus for a Vacuum Cleaner" by Jang-Keun Oh et al., the entire disclosure of which is incorporated herein by reference.

This application is related to copending U.S. patent application Ser. No. 11/137,506, filed May 26, 2005 entitled "Vacuum Cleaner Dust Collecting Apparatus" by Jung-Gyun Han et al., the entire disclosure of which is incorporated herein by reference.

This application is related to copending U.S. patent application Ser. No. 11/206,878, filed Aug. 19, 2005 entitled "Dust Collecting Apparatus of a Vacuum Cleaner" by Ji-Won Seo et al., the entire disclosure of which is incorporated herein by reference.

This application is related to copending U.S. patent application Ser. No. 11/203,990, filed Aug. 16, 2005 entitled "Dust-Collecting Apparatus and Method for a Vacuum Cleaner" by Ji-Won Seo et al., the entire disclosure of which is incorporated herein by reference.

This application is related to copending U.S. patent application Ser. No. 11/281,732, filed Nov. 18, 2005 entitled "Dust Collecting Apparatus for a Vacuum Cleaner" by Jung-Gyun Han et al., the entire disclosure of which is incorporated herein by reference.

This application is related to copending U.S. patent application Ser. No. 11/315,335, filed Dec. 23, 2005 entitled "Multi-Cyclone Dust Separating Apparatus" by Dong-Yun Lee et al., the entire disclosure of which is incorporated herein by reference.

FIELD OF THE INVENTION

The present invention relates to a dust separating apparatus. In particular, the present invention relates to a multi-cyclone dust separating apparatus of a vacuum cleaner, which draws in air and separates dust from the air.

BACKGROUND OF THE INVENTION

In general, a dust collecting apparatus of a vacuum cleaner can be classified as either a dust collecting apparatus which uses a filter or a cyclone dust collecting apparatus which separates dust from the air by centrifugal force. The term "dust" is used herein to refer collectively to dust, dirt, particulates, debris, and other similar matter that can be entrained with the air suctioned by the vacuum cleaner. The cyclone dust collecting apparatus can be further classified into a single cyclone dust collecting apparatus which separates the dust by using a single cyclone or a multi-cyclone dust collecting apparatus which separates the dust in two steps by using more than one cyclone.

Conventional cyclone dust collecting apparatuses are disclosed in Korean Patent Nos. 645375 and 437156 to the present applicant and International Patent Publication No. WO 02/067750 to Dyson. The cyclone dust collecting apparatus disclosed in Korean Patent No. 645375 includes a first cyclone and a plurality of second cyclones disposed adjacent to an outer circumferential surface of the first cyclone. The dust collecting apparatus has a reduced height but a relatively larger outer diameter due to the cyclones disposed adjacent to the outer circumferential surface of the first cyclone.

The cyclone dust collecting apparatus disclosed in Korean Patent No. 437156 has a second cyclone that is disposed in a first cyclone and has a reduced outer diameter. However, because the air to the second cyclone is drawn in through a single air inlet, a whirling force of the second cyclone is weakened. In addition, to dump the collected dust, a user has to move the entire dust collecting apparatus to a trash can. Also, because the first and the second cyclone are neither separated nor subdivided into respective components, cleaning the inner parts of the dust collecting apparatus, maintaining the dust collecting apparatus, and repairing the dust collecting apparatus is difficult.

The cyclone dust collecting apparatus disclosed in International Patent Publication No. WO 02/067750 has a height that prevents it from being applied to a canister vacuum cleaner. In addition, to dump the collected dust, the user has to move the entire the dust collecting apparatus to a trash can.

SUMMARY OF THE INVENTION

In light of these difficulties, the present invention provides a multi-cyclone dust separating apparatus capable of easily dumping dust collected therein while being compact with a small outer diameter. The multi-cyclone dust separating apparatus also improves a separating efficiency for minute dust. Further, the multi-cyclone dust separating apparatus facilitates cleaning, maintenance, and repair for components therein.

An embodiment of the present invention provides a multi-cyclone dust separating apparatus. The multi-cyclone dust separating apparatus includes a first cyclone unit having a body and including an air inlet disposed at a side of the body, a first cyclone chamber adapted to form a first space for whirling air from the air inlet to separate dust form the air; a second cyclone unit adapted to be detachably disposed at the body of the first cyclone unit and including, a second air inlet to draw the air from the first cyclone chamber, at least one cyclone for whirling the air from the first cyclone chamber to provide a second separation of dust from the air; and a dust bin adapted to be detachably mounted to at least one of the second cyclone unit and the first cyclone unit.

Another embodiment of the present invention provides a multi-cyclone dust separating apparatus. The multi-cyclone dust separating apparatus includes a first means for whirling air to separate dust from the air; a second means for whirling air adapted to be detachably disposed within the first means for whirling air and adapted for a second separation of dust from the air.; and a means for collecting the dust from at least one of the first and second means for whirling.

Yet another embodiment of the present invention provides a second cyclone unit shaped to be detachably disposed within a first cyclone unit of a multi-cyclone dust separating apparatus. The second cyclone unit includes at least one air inlet configured to draw air from the first cyclone unit and adapted to induce whirling in the air from the first cyclone unit; a cyclone body in communication with the at least one air inlet; and a dust bin adapted to be detachably mounted to the cyclone body.

BRIEF DESCRIPTION OF THE DRAWINGS

The above aspects and other advantages of the present invention will be more apparent by describing exemplary embodiments of the present invention with reference to the accompanying figures, in which.

In the figures, it should be understood that like reference numerals refer to like features.

DETAILED DESCRIPTION OF THE INVENTION

Hereinafter, a multi-cyclone dust separating apparatus according to exemplary embodiments of the present invention will now be described in greater detail with reference to the accompanying drawings.

Figure 1:
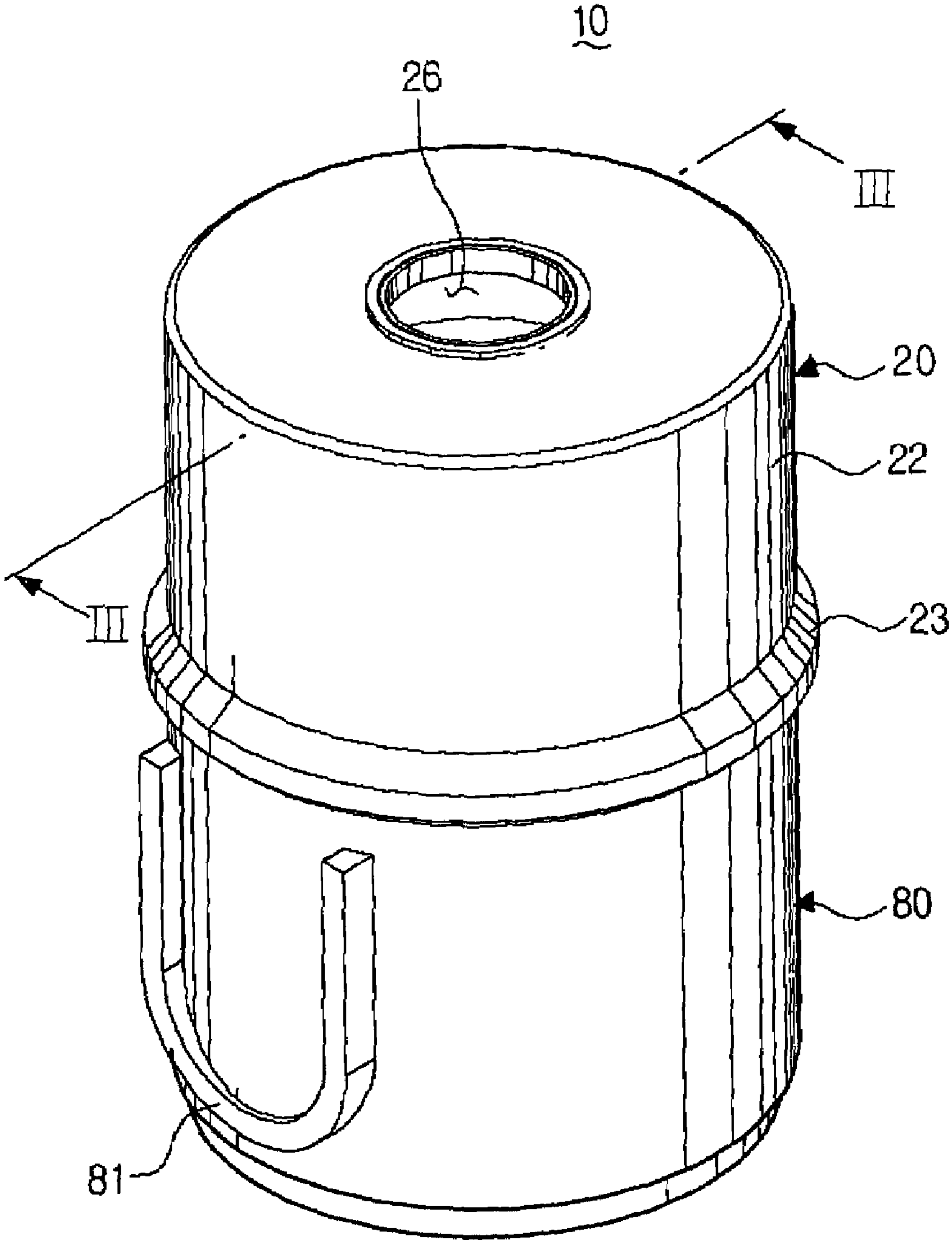
FIG. 1 is a perspective view illustrating a multi-cyclone dust separating apparatus according to an exemplary embodiment of the present invention.

FIGS. 1 through 5 show a multi-cyclone dust separating apparatus according to an exemplary embodiment of the present invention. Referring to FIG. 1, the multi-cyclone dust separating apparatus 10 may include a first cyclone unit 20 and a dust bin 80. The first cyclone unit 20 provides a first separation of dust from air, and it may include a cylindrical body 22. The cylindrical body 22 may have a cylindrical shape with a constant vertical diameter. However, a varying vertical diameter is also within the scope of the present invention. A first opening 26 may be formed as a hole at an upper surface of the cylindrical body 22 (e.g. in the middle of the upper surface). An extended part 23 extends radially outward from a lower end of the cylindrical body 22. The extended part 23 may be adapted to engage the dust bin 80. The dust bin 80 may include a handle 81.

Figure 2:
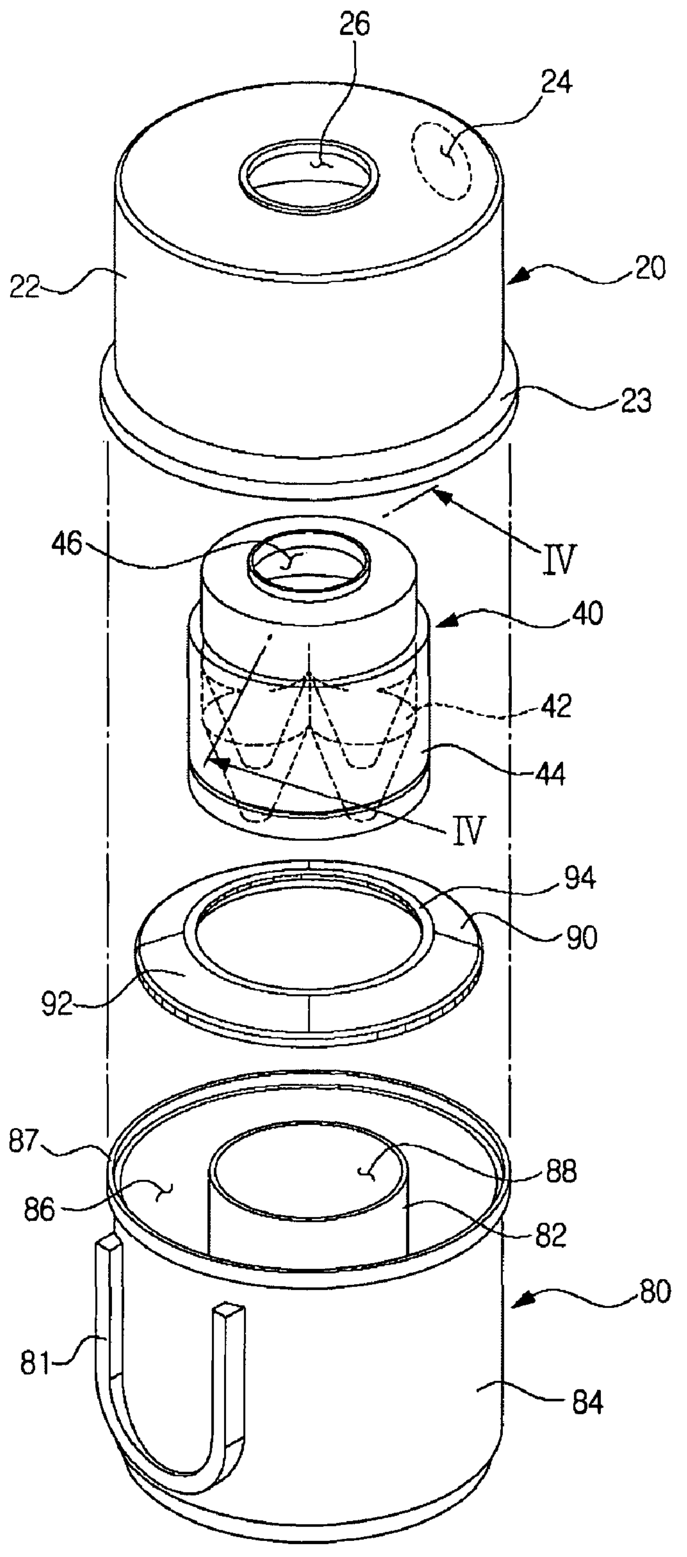
FIG. 2 is an exploded perspective view of the multi-cyclone dust separating apparatus of FIG 1.

Referring to FIG. 2, the dust bin 80 may also include at least one of an inner wall 82, an outer wall 84, a first dust collecting chamber 86, a second dust collecting chamber 88, and an inserting part 87. The inner wall 82 may be a cylindrical member disposed within the outer wall 84 in a spaced-apart relation to the outer wall 84. A space between the outer wall 84 and the inner wall 82 may form the first dust collecting chamber 86. An inner space formed by the inner wall 82 may form the second dust collecting chamber 88. The inserting part 87 may be formed on an upper end of the dust bin 80 to engage the extended part 23 of the first cyclone unit 20. The handle 81 may be formed on an outer circumferential surface of the outer wall 84 so that a user can grip the dust bin 80 and separate it from the first cyclone unit 20 and a second cyclone unit 40 disposed within the first cyclone unit 20. The handle 81 may have a substantially U-shaped form. Accordingly, the user can separate the dust collecting bin 80 from the first cyclone unit 20 and the second cyclone unit 40 and carry only the dust collecting bin 80 using the handle 81. Thus, the user can more conveniently dump the dust, without having to carry the entire multi-cyclone dust separating apparatus 10 in order to dump the dust, like the conventional multi-cyclone dust separating apparatus.

The first cyclone unit 20 may have an air inlet 24 formed in the substantial shape of a circle at one side of the cylindrical body 22. The air inlet 24 may be formed tangentially to the cylindrical body 22 so that air drawn into the first cyclone chamber 27 can flow along an inner wall of the cylindrical body 22 to form a whirling motion.

The second cyclone unit 40 is adapted to be disposed within the first cyclone unit 20. The second cyclone unit 40 provides a second separation of dust from the air and thus improves dust separating efficiency. Further, because the second cyclone unit 40 may be disposed within the first cyclone chamber 27, the second cyclone unit 40 does not increase the volume of the multi-cyclone dust separating apparatus 10 and thus the dust separating apparatus 10 can maintain a compact size. The second cyclone unit 40 may include a second opening 46. The second opening 46 may be formed as a hole at an upper surface of the second cyclone unit 40. The second opening 46 may be in the middle of the upper surface.

The second cyclone unit 40 may also be coupled to a skirt member 90. The skirt member 90 may have a connecting part 94 which may couple to the second cyclone unit 40. The skirt member 90 may also have an inclined part 92 which is diagonally inclined. The skirt member 90 may be formed of an elastic material. In the present embodiment, the skirt member 90 is formed of rubber. Because the skirt member 90 may be downwardly inclined, it can be deformed by a downwardly pushing force but is not substantially deformed by an upwardly pushing force. Thus, large-sized dust, such as a coin, a cap or the like, can be collected in the dust bin 80 by deflecting the skirt member 90 downward, but the skirt member 90 effectively prevents the dust from flowing backwards from the dust bin 80. After being deflected, the skirt member 90 may elastically return to its original state by its own elastic force.

Figure 3:
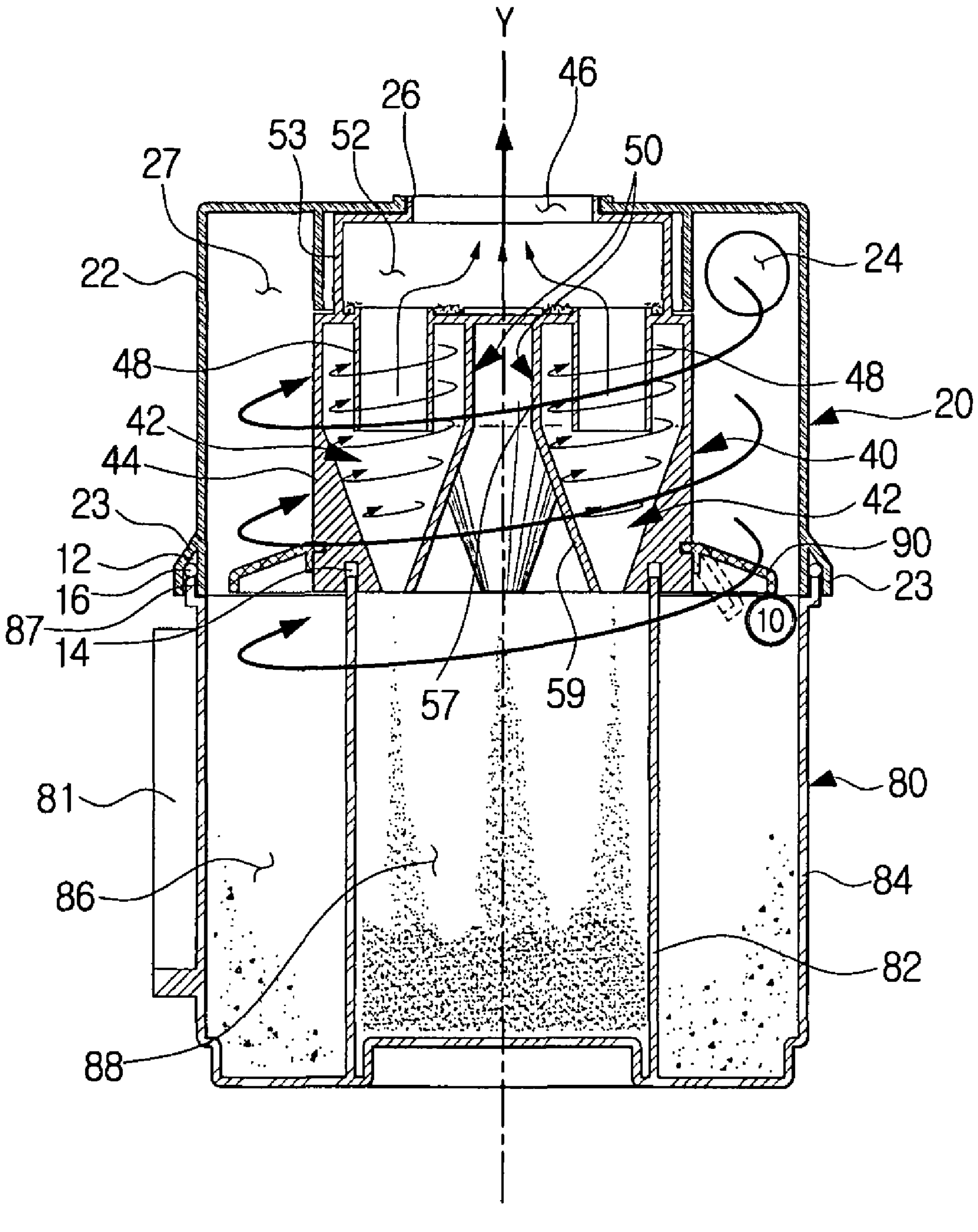
FIG. 3 is a cross-sectional view taken along line III-III of the multi-cyclone dust separating apparatus of FIG. 1.

Referring to FIG. 3, the first cyclone unit 20 and the dust bin 80 may be coupled by the extended part 23 and the inserting part 87 engaging each other. The extended part 23 may form a first groove 12. The inserting part 81 may be formed on an upper end of the dust bin 80. The inserting part 81 may be received in the first groove 12 formed on the cylinder body 22 of the first cyclone unit 20 so that the dust bin 80 and the cylindrical body 22 are coupled to each other. The inserting part 81 may be formed with a slightly enlarged outer diameter. A rubber ring 16 may be mounted in the first groove 12 and may seal the joined portions between the dust bin 80 and the cylindrical body 22.

The first cyclone unit 20, the second cyclone unit 40, the dust bin 80, and the skirt member 90 may be constructed separately and detachably assembled to one another. In the conventional multi-cyclone dust separating apparatus, if the dust is to be dumped, the user has to transport the entire dust separating apparatus to a trash can to dispose the dust because the conventional multi-cyclone dust separating apparatus has a bottom hatch that must be opened to dump the dust. Also, the conventional multi-cyclone dust separating apparatus has a large size. However, in the multi-cyclone dust separating apparatus 10 according to an embodiment of the present invention, the dust bin 80 may be separable from the cylindrical body 22 of the first cyclone unit 20 so that the user only has to transport the dust bin 80 to the trash can to dump the dust and leave the heavier cyclone units in the vacuum cleaner. Further, by disposing the second cyclone unit 40 within the first cyclone unit 20, the present invention can achieve a compact structure. The second cyclone unit 40 and the first cyclone unit 20 may be substantially concentric and may substantially have the same center axis Y.

Figure 4:
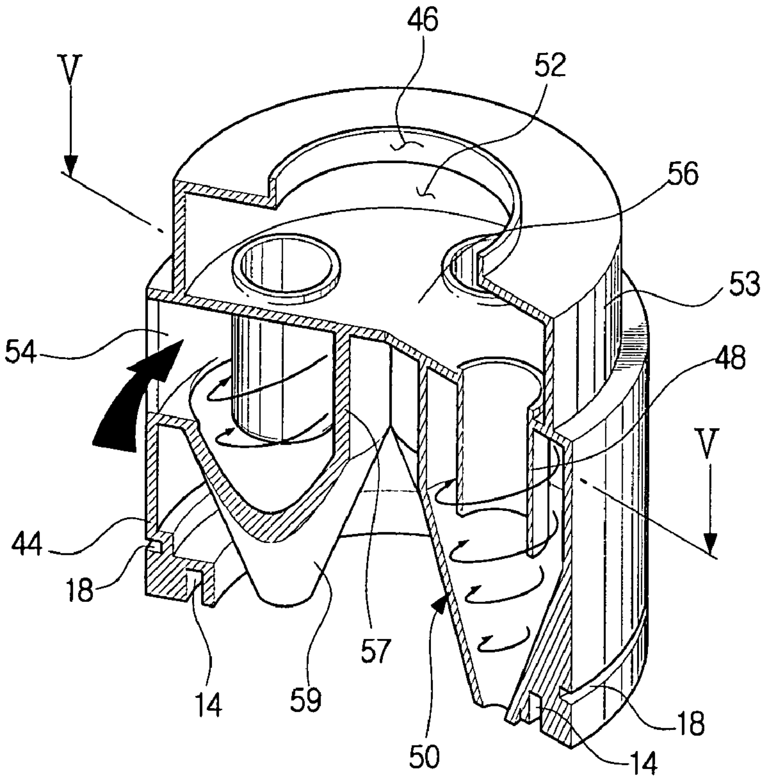
FIG. 4 is a perspective view illustrating a second cyclone unit of the multi-cyclone dust separating apparatus of FIG. 3.

Referring to FIG. 4, the second cyclone unit 40 may include a second cyclone 42, an outer wall 44, and an air stagnating space 52. The outer wall 44 may have a third groove 18 formed on its circumferential surface at a lower part thereof. The connecting part 94 of the skirt member 90 may be mounted in the third groove 18. The outer wall 44 may also have a second groove 14 formed at a lower end thereof. An upper end of the inner wall 82 of the dust bin 80 may be inserted into the second groove 14.

The air stagnating space 52 may be disposed above the second cyclones 42 to provide a space where air discharged from the second cyclones 42 can be gathered. The air stagnating space 52 may be defined by a stagnating space wall 53 formed as a cylinder having an outer diameter smaller than the outer wall 44. The stagnating space wall 53 may project upward from the upper wall 56. The stagnating space wall 53 may have the second opening 46 formed at an upper surface to couple with the first opening 26. The second opening 46 of the second cyclone unit 40 may lead the air discharged from the air stagnating space 52 to the outside.

The second cyclones 42 of the second cyclone unit 40 may have similar size and height with respect to each other. Each of the second cyclones 42 may include a second air inlet 54, a second cyclone body 50, and a second discharging pipe 48. The second cyclone body 50 may have an upper part 57 formed substantially as a cylinder and a lower part 59 formed substantially as a cone. The second cyclone body 50 may be formed integrally with the outer wall 44. The outer wall 44 may have the same outer diameter over its entire height or its diameter may vary with its height. The outer wall 44 may also be formed to surround all of the second cyclones 42.

In the embodiment depicted, four second cyclones 42 are disposed next to each other in parallel at intervals of 90°. Four second air inlets 54 are also arranged in corresponding intervals of 90°. The number of second cyclones 42 illustrated is exemplary only and is not intended to be limiting; the optimal number of second cyclones 42 may be less or more than the four second cyclones 42 depicted in FIG. 4.

The second discharging pipe 48 may be formed as a cylindrical pipe and may have one end disposed to penetrate an upper wall 56 and another end may be disposed to penetrate the inside of the second cyclone body 50. A lower end of the second discharging pipe 48 may extend to where a shape of the second cyclone body 50 changes. In particular, the second discharging pipe 48 may extend to where the cylinder shape and the cone shape meet with each other.

Figure 5:
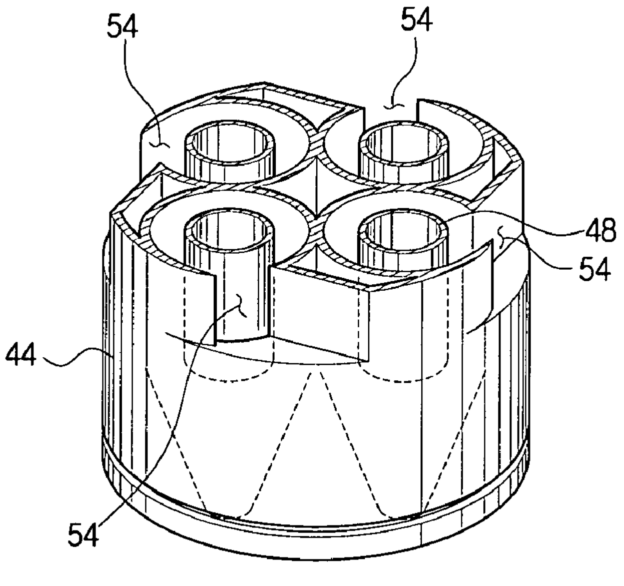
FIG. 5 is a perspective view of the second cyclone unit taken along line V-V of FIG. 4.

Referring to FIG. 5, the second air inlets 54 may be formed to penetrate a portion of the outer wall 44 in a rectangular shape. In the embodiment depicted, four second air inlets 54 are arranged in intervals of 90°.

Hereinafter, an operation of the multi-cyclone dust separating apparatus 10 according to an exemplary embodiment of the present invention constructed as described above will be explained with reference to FIG. 3.

The air may be drawn into the first cyclone chamber 27 through the air inlet 24. The first cyclone chamber 27 may be an inner space of the cylindrical body 22. Because the air inlet 24 may be formed tangentially to the cylindrical body 22 so that the air drawn into the first cyclone chamber 27 may flow along an inner wall of the cylindrical body 22, the air may whirl about the second cyclone unit 40 in the first cyclone chamber 27. Dust may then be separated from the air by a centrifugal force while the air whirls in the first cyclone chamber 27. Dust may be dashed against the inner surface of the cylindrical body 22 and fall downward due to its own weight into the first dust collecting chamber 86 of the dust bin 80. Relatively larger-sized dust may fall downward into the first dust collecting chamber 86, particularly, large-sized dust, such as a coin, a cap or the like. As the dust falls downward, the dust may bend the skirt member 90 in a downward direction, as illustrated by the dotted lines. Because the skirt member 90 may be made of an elastic material, the skirt member 90 may return to its original shape afterwards.

The air from which the large-sized dust is separated may then be drawn into the second cyclones 42 through second air inlets 54 (shown in FIGS. 4 and 5). Minute dust may be separated from the drawn-in air while whirling about the second discharging pipe 48 in the second cyclone body 50. The separated minute dust may fall downward into the second dust collecting chamber 88, and the air from which the minute dust is separated may be discharged into the air stagnating space 52 through the second discharging pipe 48.

Because the air stagnating space 52 may have a volume larger than the second discharging pipe 48, the velocity of the air may rapidly decrease, and thus even a very small amount of minute dust riding along in the air flow may settle down on the upper wall 56 by its own weight. An upper end of the stagnating space wall 53 may have substantially the same height as that of the upper end of the cylindrical body 22 of the first cyclone unit 20. The air discharged from the second cyclones 42 may be mixed with air in the air stagnating space 52 and then discharged to the outside of the dust collecting unit 10 through the second and the first openings 46 and 26. Because the air may have time to stagnate in the large volume of the air stagnating space 52, the whirling motion of the air may decrease which may reduce noise caused by the whirling motion.

When a portion of the air whirling in the first cyclone chamber 27 flows down to the first dust collecting chamber 86, the dust collected in the first dust collecting chamber 86 may flow back towards the first cyclone chamber 27 by riding in the whirling air. However, the skirt member 90 may block the first cyclone chamber 27 from the first dust collecting chamber 86. For the second cyclone unit 40, because the lower part of the second cyclone body 50 is formed substantially as a cone, the lower end hole of the second cyclone body 50 provides only a small opening through which dust can flow. Thus, minute dust collected in the second dust collecting chamber 88 is substantially prevented from flowing backwards through the lower end hole of the second cyclone body 50.

Figure 6:
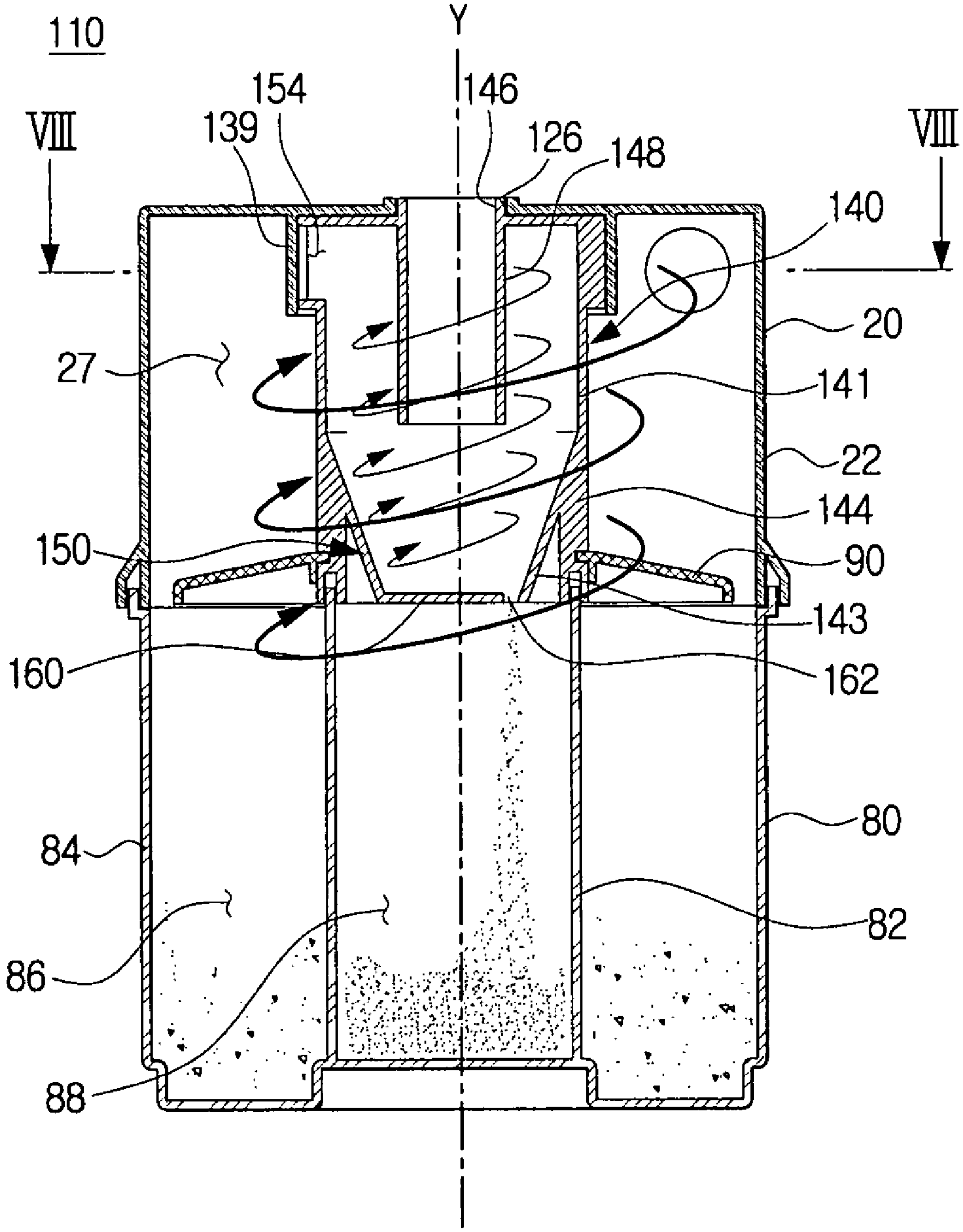
FIG. 6 is a sectional view illustrating a multi-cyclone dust separating apparatus according to another embodiment of the present invention.
Figure 7:
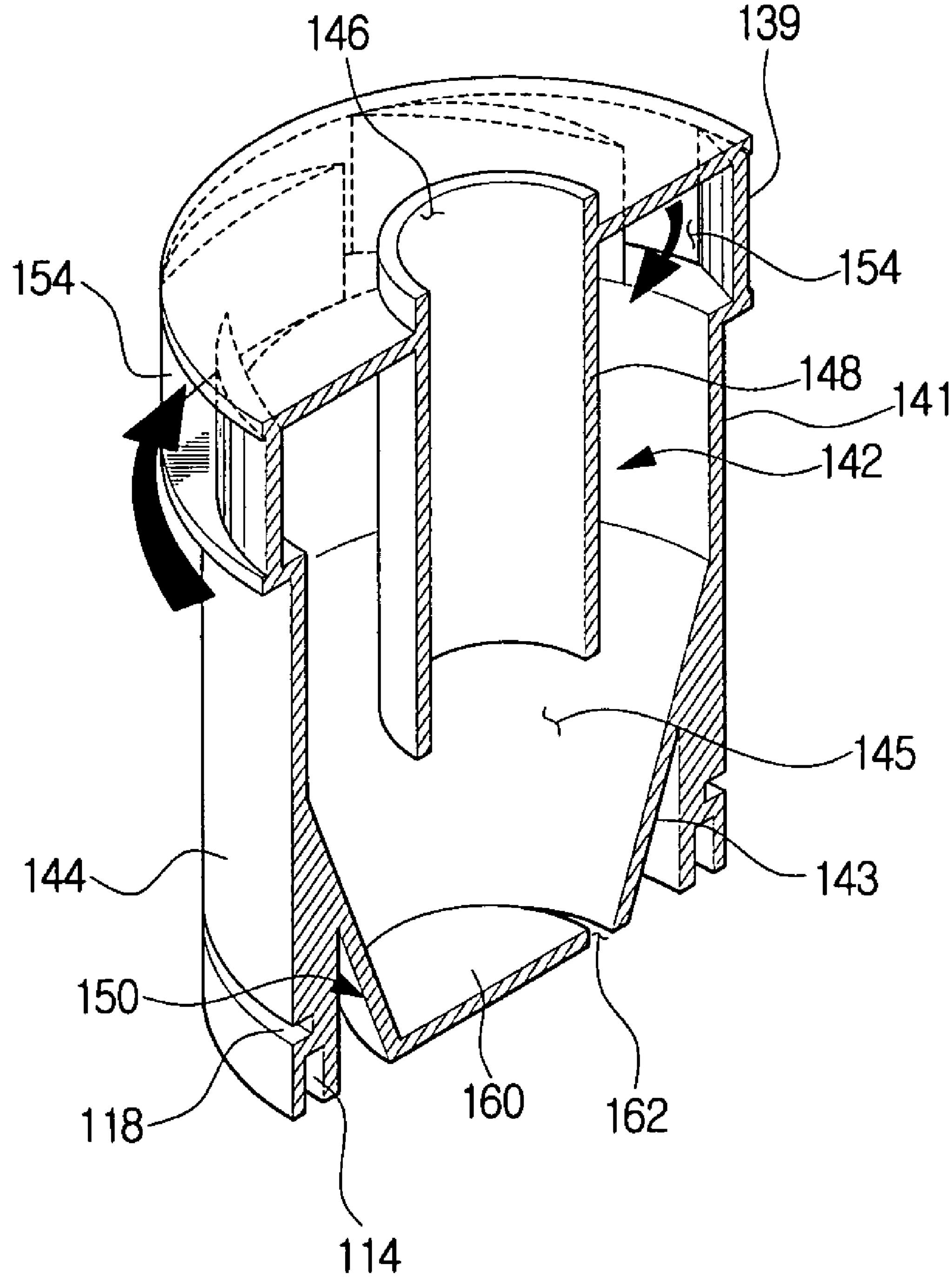
FIG. 7 is a sectional perspective view illustrating a second cyclone unit of the multi-cyclone dust separating apparatus of FIG. 6.
Figure 8:
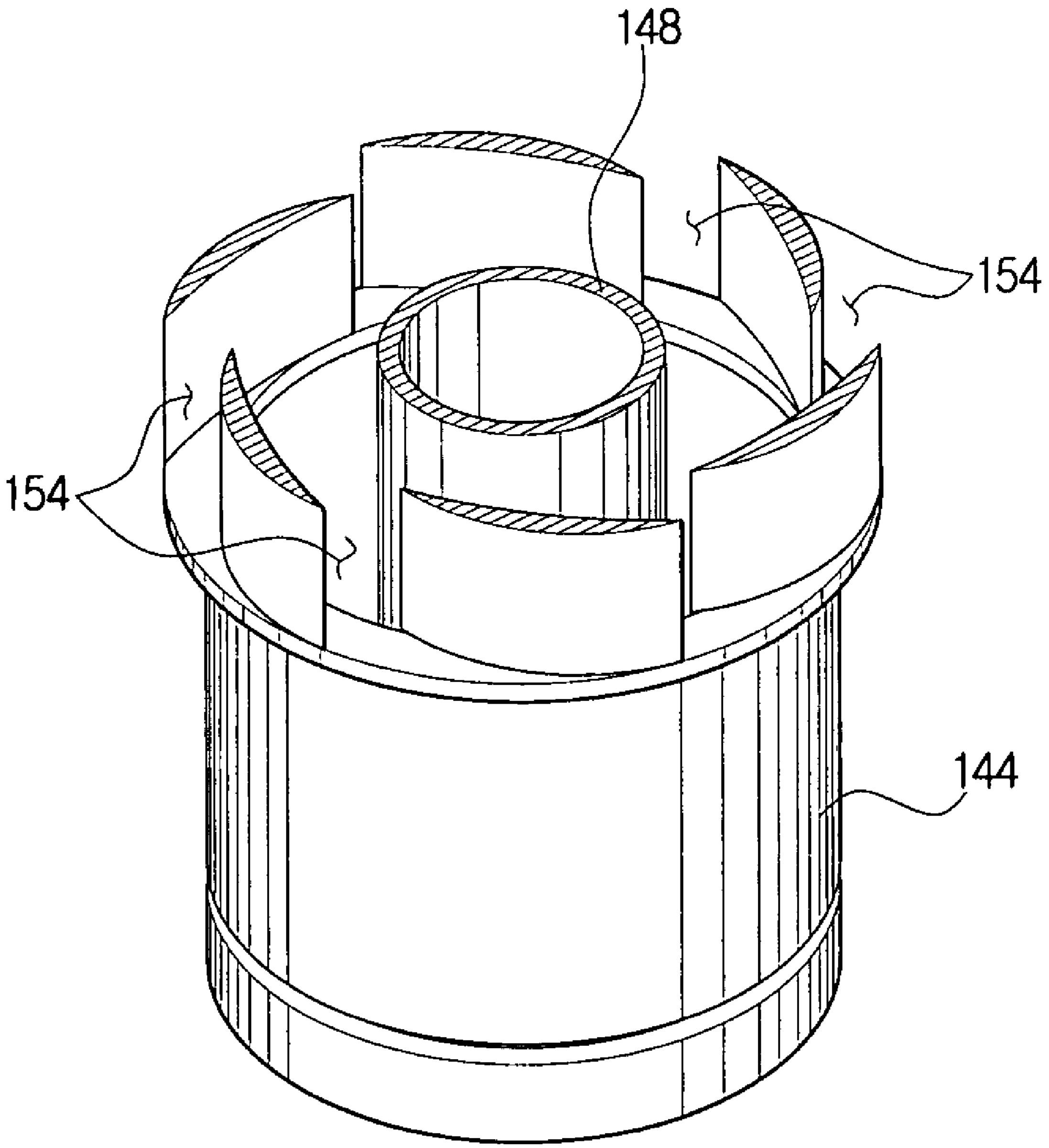
FIG. 8 is a perspective view exemplifying the second cyclone unit of the multi-cyclone dust separating apparatus, taken along line VIII-VIII of FIG. 6.

FIGS. 6 through 8 show a multi-cyclone dust separating apparatus 110 according to another exemplary embodiment of the present invention. Referring to FIG. 6, the multi-cyclone dust separating apparatus according to another exemplary embodiment of the present invention may include a first cyclone unit 20, a second cyclone unit 140, and a dust bin 80. The second cyclone unit 140, the first cyclone unit 20, the dust bin 80 and the skirt member 90 may be formed as separate members, respectively, so that they can be assembled with one other. The first cyclone unit 20 and the second cyclone unit 140 may have the same center axis Y. Because the first cyclone unit 20 and the dust bin 80 are substantially same as those of the first exemplary embodiment, the same reference numerals as those of the first exemplary embodiment are used and their detailed descriptions are omitted.

The second cyclone unit 140 may provide a single cyclone in addition to the cyclone of the first cyclone unit 20. The second cyclone unit 140 may include a second cyclone body 150, an outer wall 144, a second air inlet 154, and a second discharging pipe 148. The second cyclone body 150 may include an extended-diameter part 139, a cylindrical upper part 141, and a reverse cone-shaped lower part 143. The extended-diameter part 139 may have an outer diameter larger than that of the upper part 141. A portion of the extended-diameter part 139 may project radially inward to form the second air inlet 154. The upper part 141 may have the same outer diameter as that of the outer wall 144. The cone-shaped lower part 143 may be configured, so that an outer diameter thereof gradually reduces from its top to its bottom.

The second cyclone body 150 at a lower end thereof may have a backflow prevention plate 160. The backflow prevention plate 160 may be a plate having an area smaller than that of a lower end hole of the second cyclone body 150. A dust discharging gap 162 through which dust can be discharged may be formed at a side of the backflow prevention plate 160. Because the second cyclone body 150 may be larger than the second cyclone body 50 of the embodiment depicted in FIGS. 3-5, the lower end hole of the second cyclone body 150 may be relatively larger. Accordingly, minute dust collected in a second dust collecting chamber 88 may flow backwards through the lower end hole. However, the backflow prevention plate 160 may substantially prevent the minute dust from flowing backwards.

Referring to FIG. 7, the outer wall 144 may have a substantially cylindrical shape with a constant diameter in a height direction. The outer wall 144 may be provided with a second groove 114 and a third grooves 118 similar to the embodiment of FIGS. 3-5.

A plurality of second air inlets 154 may be disposed in the extended-diameter part 139. The plurality of second air inlets 154 may be disposed so that each second air inlet 154 is spaced apart along a circumferential direction of the extended-diameter part 139. Each second air inlet 154 may be configured to project radially inward from the extended-diameter part 139. Each second air inlet 154 may be formed with a substantially rectangular shape. Accordingly, air taken in through the second air inlets 154 may whirl about the second discharging pipe 148. A whirling force of the air may be enhanced because the air may be partitioned as it is drawn in through the plurality of air inlets 154.

The second discharging pipe 148 may be coupled to a second opening 146 of the second cyclone unit 140. The second opening 146 may be coupled to a first opening 126 (shown in FIG. 6). Because the second opening 146 may be coupled to the first opening 126, and the second discharging pipe 148 may be coupled in the second opening 146, there is no air stagnating space 52 (see FIG. 3) as in the first exemplary embodiment. Thus, the air passing through the second discharging pipe 148 may be discharged to the outside directly. A lower end of the second discharging pipe 148 may extend downward to a position where a lower part of the second cyclone body 150 ends.

Referring to FIG. 8, six second air inlets 154 may be disposed on the extended-diameter part 139. The number of second air inlets 154 illustrated is exemplary only and is not intended to be limiting; the optimal number of second air inlets 154 may be less or more than the six second air inlets 154 depicted in FIG. 8.

Hereinafter, an operation of the multi-cyclone dust separating apparatus 110 according to the second exemplary embodiment of the present invention will be explained with reference to FIG. 6. Because the drawing in of air into the first cyclone unit 20 and the separation and dumping of relatively large-sized dust in the first cyclone unit 20 are substantially the same as that of the first exemplary embodiment, detailed description thereof is omitted.

After large-sized dust is separated from the air in the first cyclone chamber 27, the air may be drawn in into the plurality of second air inlets 154 of the second cyclone unit 140. The plurality of second air inlets 154 may partition the air that is drawn in and may cause it to whirl. The small cross sections of the respective second air inlets 154 may accelerate the flow of the air thus increasing a whirling force of the air and improving a separating efficiency for minute dust. The minute dust that may be separated from the air falls down toward the backflow prevention plate 160 while the air is whirling. Because the minute dust may whirl with the air, it may fall down through the dust discharging gap 162 formed on a side of the backflow prevention plate 160. The dust that may fall is stored in the second dust collecting chamber 88. The air may then be discharged to the outside of the dust separating apparatus 110 through the second discharging pipe 148. Any dust that may rise from the second dust collecting chamber 88 may be blocked by the backflow prevention plate 160 and thus may not be drawn in into the second cyclone body 150.

As apparent from the foregoing description, according to the exemplary embodiments of the present invention, the multi-cyclone dust separating apparatus may be configured so that the plurality of second cyclones which improves the dust separating apparatus can be disposed in the first cyclone body. Accordingly, the outer diameter of the multi-cyclone dust separating apparatus may be smaller, thereby allowing the multi-cyclone dust separating apparatus to have an overall compact size. Also, because the multi-cyclone dust separating apparatus according to the exemplary embodiments of the present invention may allow the dust bin to be easily separated from the first and the second cyclone units, unlike the conventional multi-cyclone dust separating apparatus, the user can separate only the dust bin to dump the dust collected in the multi-cyclone dust separating apparatus.

Further, the multi-cyclone dust separating apparatus according to the exemplary embodiments of the present invention may be configured so that the plurality of second cyclones can be disposed in parallel or so that the plurality of second air inlets may be formed in the single second cyclone, thereby improving the dust separating efficiency for minute dust.

Moreover, the multi-cyclone dust separating apparatus according to the exemplary embodiments of the present invention may be configured so that the first cyclone body, the second cyclone unit, and the dust bin can be assembled with and separated from one another, unlike the conventional multi-cyclone dust separating apparatus, thereby allowing convenient maintenance and repair of the respective components.

Also, the multi-cyclone dust separating apparatus according to the exemplary embodiments of the present invention may be configured to include the elastic skirt member and the backflow prevention plate disposed on the lower end of the second cyclone to prevent the collected dust from flowing backwards but may allow the hard and large-sized dust, such as coins, caps, or the like, to be collected.

Also, the multi-cyclone dust separating apparatus according to the exemplary embodiments of the present invention may be configured to include the air stagnating space above the plurality of second cyclones, thereby reducing the whirling of the air and minimizing the associated noise.

Although representative embodiments of the present invention have been shown and described in order to exemplify the principles of the present invention, the present invention is not limited to the specific exemplary embodiments. It will be understood that various modifications and changes can be made by one skilled in the art without departing from the spirit and scope of the invention as defined by the appended claims. Therefore, it shall be considered that such modifications, changes, and equivalents thereof are all included within the scope of the present invention.

What is claimed is:

1. A multi-cyclone dust separating apparatus, comprising:
- a first cyclone unit having a body and including,
  - an air inlet disposed at a side of the body,
  - a first cyclone chamber adapted to form a first space for whirling air from the air inlet to separate dust from the air;
- a second cyclone unit adapted to be detachably disposed at the body of the first cyclone unit and including,
  - a second air inlet to draw the air from the first cyclone chamber,
  - at least one cyclone for whirling the air from the first cyclone chamber to provide a second separation of dust from the air; and
- a dust bin adapted to be detachably mounted to at least one of the second cyclone unit and the first cyclone unit, wherein the second cyclone unit comprises a plurality of cyclones of approximately similar dimensions adapted to be disposed substantially adjacent to each other.

2. The multi-cyclone dust separating apparatus of claim 1, wherein the first cyclone unit and the second cyclone unit are adapted to be substantially concentric.

3. The multi-cyclone dust separating apparatus of claim 1, wherein the second cyclone unit further comprises an air stagnating space formed above the at least one cyclone.

4. The multi-cyclone dust separating apparatus of claim 1, wherein the second cyclone unit further comprises an outer wall adapted to surround at least a portion of the at least one cyclone.

5. The multi-cyclone dust separating apparatus of claim 4, further comprising a skirt member adapted to be disposed at the outer wall.

6. The multi-cyclone dust separating apparatus of claim 5, wherein the skirt member includes an elastic material.

7. The multi-cyclone dust separating apparatus of claim 1, wherein the second cyclone unit comprises a cyclone body shaped substantially as a cone.

8. The multi-cyclone dust separating apparatus of claim 1, wherein the dust bin includes an inner wall adapted to divide a first dust collecting chamber adapted for storing the dust from the first cyclone chamber and a second dust collecting chamber adapted to store the dust from the second cyclone unit.

9. The multi-cyclone dust separating apparatus of claim 8, wherein the second cyclone unit further comprises a backflow prevention plate adapted to prevent the dust from flowing backwards from the second dust collecting chamber.

10. The multi-cyclone dust separating apparatus of claim 8, wherein the second cyclone unit further comprises a substantially elastic skirt member adapted to prevent the dust from flowing backwards from the first dust collecting chamber.

11. A multi-cyclone dust separating apparatus, comprising:
- a first means for whirling air to separate dust from the air;
- a second means for whirling air adapted to be detachably disposed within the first means for whirling air and adapted for a second separation of dust from the air; and
- a means for collecting the dust from at least one of the first and second means for whirling, wherein the second means for whirling air includes a plurality of means for whirling air.

12. The multi-cyclone dust separating apparatus of claim 11, wherein the first means for whirling air includes a means for preventing backflow from the dust collecting means.

13. The multi-cyclone dust separating apparatus of claim 11, further comprising a means for reducing the whirling of air leaving the second means for whirling air.

14. The multi-cyclone dust separating apparatus of claim 11, wherein the second means for whirling air includes a means for preventing backflow from the dust collecting means.

15. A second cyclone unit shaped to be detachably disposed within a first cyclone unit of a multi-cyclone dust separating apparatus, the second cyclone unit comprising:
- at least one air inlet configured to draw air from the first cyclone unit and adapted to induce whirling in the air from the first cyclone unit;
- a cyclone body in communication with the at least one air inlet;
- a dust bin adapted to be detachably mounted to the cyclone body;
- and a plurality of means for whirling air.

16. The second cyclone unit of claim 15, further comprising an air stagnating space in communication with the cyclone body.

17. The second cyclone unit of claim 15, further comprising a backflow prevention plate disposed at the cyclone body.

18. The second cyclone unit of claim 15, wherein the cyclone body is substantially formed as a cone.

* * * * *